United States Patent
Kim (10) Patent No.: US 8,782,118 B2
(45) Date of Patent: Jul. 15, 2014

(54) METHOD TO MANAGE NETWORK PRINTERS AND NETWORK SYSTEM USING THE SAME

(75) Inventor: Byoung Yue Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1212 days.

(21) Appl. No.: 11/955,735

(22) Filed: Dec. 13, 2007

(65) Prior Publication Data

US 2008/0155570 A1 Jun. 26, 2008

(30) Foreign Application Priority Data

Dec. 20, 2006 (KR) .......................... 10-2006-131110

(51) Int. Cl.
*G06F 15/16* (2006.01)

(52) U.S. Cl.
USPC ............ 709/202; 709/220; 709/223; 709/224

(58) Field of Classification Search
USPC .................................. 709/202, 220, 223, 224
See application file for complete search history.

(56) References Cited

U.S. PATENT DOCUMENTS

| | | | | |
|---|---|---|---|---|
| 7,580,936 | B2 * | 8/2009 | Salgado | 707/999.01 |
| 7,873,691 | B2 * | 1/2011 | Nishio | 709/202 |
| 2008/0126557 | A1 * | 5/2008 | Motoyama et al. | 709/232 |

FOREIGN PATENT DOCUMENTS

| | | |
|---|---|---|
| JP | 2001-331458 | 11/2001 |
| JP | 2004-24579 | 1/2004 |

OTHER PUBLICATIONS

Office Action issued in KR 2006-0131110 dated Nov. 19, 2012.

* cited by examiner

*Primary Examiner* — Andy Ho
(74) *Attorney, Agent, or Firm* — Stanzione & Kim, LLP (57) ABSTRACT

A management method of network printers and a network system using the same, which are capable of easily allowing a network manager to collect management information by allowing the network printers manufactured by different companies to be compatible with each other. When connections between object identifications of the network printers and object identifications of the other network printers are previously set by a user, the network manager can easily collect the management information of the network printers using the same object identification.

21 Claims, 10 Drawing Sheets

FIG. 1

(PRIOR ART)

FIG. 2

(PRIOR ART)

| NO | Static OID | Mapping OID |
|---|---|---|
| 1 | 1.3.6.1.4.1.512.9.3.1.3 | 1.3.6.1.4.1.236.2.1.1 |
| 2 | 1.3.6.1.4.1.512.9.3.1.2 | 1.3.6.1.4.1.236.2.1.3 |
| 3 | 1.3.6.1.4.1.512.9.3.1.1 | 1.3.6.1.4.1.236.2.1.2 |

Add Mapping OID

METHOD TO MANAGE NETWORK PRINTERS AND NETWORK SYSTEM USING THE SAME

CROSS-REFERENCE TO RELATED APPLICATIONS

This application claims priority under 35 U.S.C. §119(a) from Korean Patent Application No. 2006-131110, filed on Dec. 20, 2006 in the Korean Intellectual Property Office, the disclosure of which is incorporated herein in its entirety by reference.

BACKGROUND OF THE INVENTION

1. Field of the Invention

The present general inventive concept relates to a method to manage network printers and a network system using the same, and, more particularly, to a method to manage network printers capable of connecting object identifications such that network printers are compatible with one another, and a network system using the same.

2. Description of the Related Art

With the growth and complexity of a network and the increase the number of print jobs using the network, network management is of great importance. A protocol used in the network management may be a simple network management protocol (SNMP).

In order to perform SNMP communication, an SNMP agent having information on a network element (NE) and an SNMP manager for collecting and managing the information are required.

The SNMP manager communicates with a plurality of SNMP agents, that is, SNMP agents 1 and 2, and has a database DB for storing network management information collected through the communication. At this time, in order to perform the SNMP communication, operations such as Get-Request, GetNext-Request, Set-Request and Response are supported.

Each of the SNMP agents 1 and 2 includes an object identification (OID) storage unit for storing OID for identifying an object such as information to be managed or a resource, a standard management information base (MIB) and a private MIB. The standard MIB and the private MIB have a hierarchical tree structure. The standard MIB has management information which is defined by an international certified institute and the private MIB has management information which is not defined by the standard MIB.

The SNMP agents may be network equipments such as a router, a personal computer and a printer.

When various types of network printers manufactured by the different companies are mixed in a single network, the private MIBs of the SNMP agents, which respectively correspond to the network printers manufactured by the different companies, are different from one another. Accordingly, managing the various types of network printers manufactured by the different companies by the SNMP manager is difficult.

Figure 1:
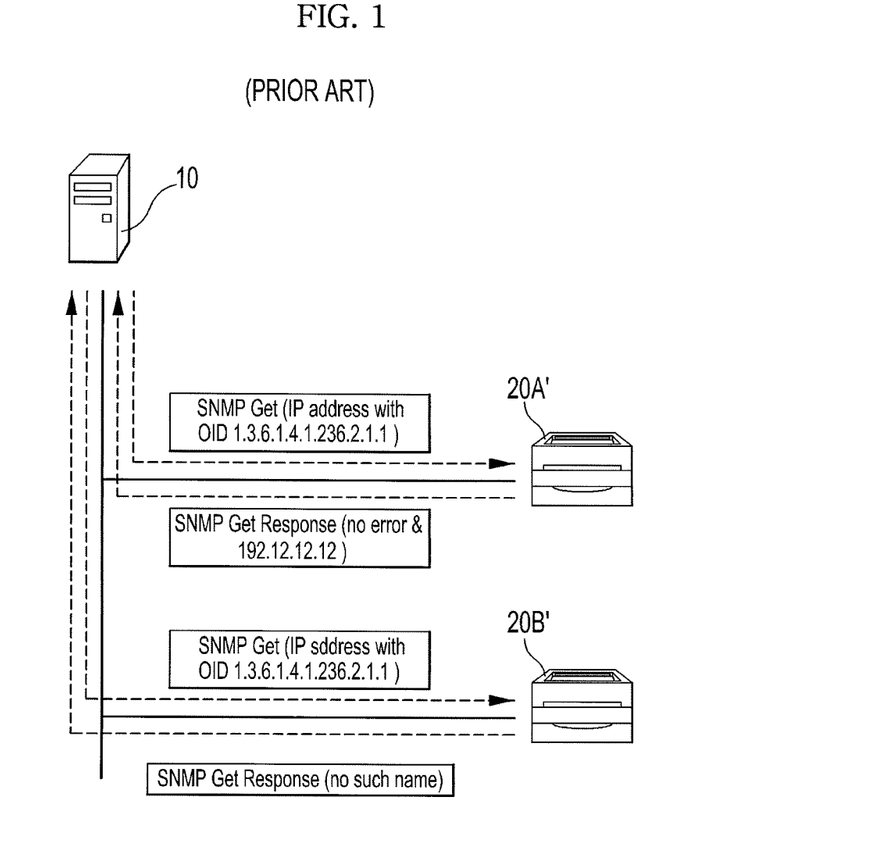
FIG. 1 is a view illustrating an operation in which a conventional host device communicates with conventional network printers 1 and 2.

FIG. 1 is a view illustrating an operation in which a conventional manager server 10 communicates with network printers 1 and 2 (20A' and 20B'). When the network printers (20A' and 20B') manufactured by the different companies are connected to the single network, as illustrated in FIG. 1, the host device 10, which functions as the SNMP manager, communicates with a network printer 1 (20A') corresponding to the SNMP agent 1 and a network printer 2 (20B') corresponding to the SNMP agent 2 and collects information to manage the network printers 20A' and 20B'. For example, the respective SNMP agent 20A and 20B may reside in the corresponding network printer 20A' and 20B'.

The OID of an address ipAddrinfo(1) of the network printer 1 20A' manufactured by the company A is 1.3.6.1.4.1.236.2.1.1 and the OID of an address ipAddrinfo (3) of the network printer 2 20B' manufactured by the company B is 1.3.6.1.4.1.512.3.1.3.

Referring to FIG. 1, when the host device 10 transmits an SNMP Get (IP address with the OID 1.3.6.1.4.1.236.2.1.1) to the network printers 1 and 2 (20A' and 20B') in order to obtain address information of the network printers 1 and 2 (20A' and 20B'), the network printer 1 (20A') searches the private MIB, recognizes that the received OID is its own OID, generates a response packet including an address 192.12.12.12 of the network printer 1 (20A') by a processing routine, and transmits an SNMP Get Response to the host device 10. Thus, the host device 10 receives the address 192.12.12.12 of the network printer 1 (20A').

Figure 2:
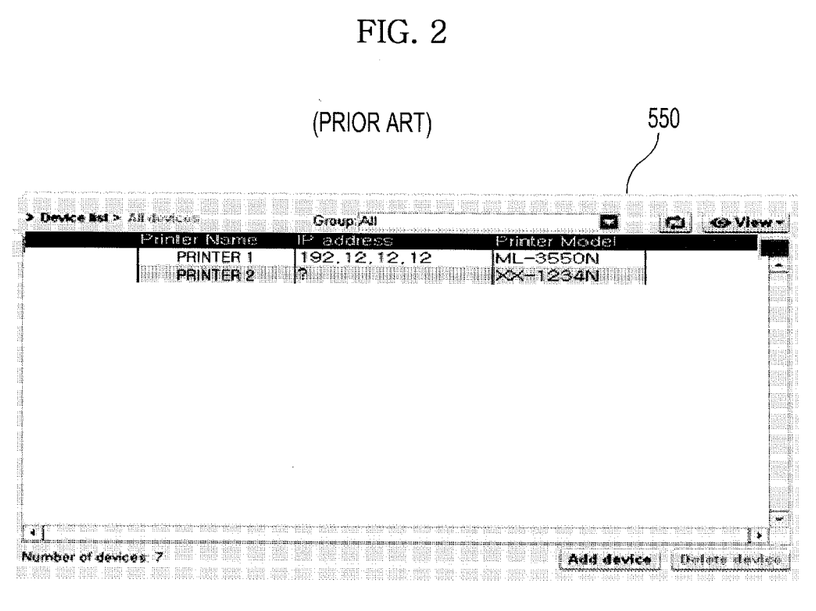
FIG. 2 is a view illustrating a case where management information of conventional network printers 1 and 2 connected to a network is displayed on a screen such that the host device provides the management information to a user.

However, the network printer 2 (20B') searches the respective private MIB, recognizes that the received OID is not its own OID 1.3.6.1.4.1.512.3.1.3 and transmits the SNMP Get Response to the host device 10 without performing an additional processing routine. Accordingly, the host device 10 does not receive the address of the network printer 2 (20B'). Accordingly, as illustrated in FIGS. 1 and 2, the host device 10 can provide the address of the conventional network printer 1 (20A'), but cannot provide a user with the address of the printer 2 (20B') as displayed on a screen 550.

As described above, when the network printers 20A' and 20B' are manufactured by the different companies, the structures of the respective private MIBs of the network printers 20A' and 20B' manufactured by the different companies are configured to be different from one another. When the SNMP manager communicates with an incompatible network printer using the same OID, the SNMP manager cannot obtain desired information from the network printer 20A' and 20B'.

The SNMP manager may collect desired management information using the respective OIDs corresponding to the network printers 20A' and 20B' from the various types of network printers manufactured by the different companies. However, management efficiency of the network printers deteriorates and takes a large amount of time to collect the desired management information.

SUMMARY OF THE INVENTION

The present general inventive concept provides an apparatus and method to manage network printers, which are capable of easily allowing a network manager to collect management information by allowing the network printers having different MIB structures to be compatible with each other.

Additional aspects and utilities of the present general inventive concept will be set forth in part in the description which follows and, in part, will be obvious from the description, or may be learned by practice of the present general inventive concept.

The foregoing and/or other aspects and utilities of the present inventive concept may be achieved by providing a method to manage a plurality of network printers, to collect management information of the network printers connected to a host device, the method including transmitting first object identifications of the plurality of network printers and second object identifications of the plurality of network printers, storing setting information corresponding to the transmitted first object identifications and second object identifications, receiving at least one object identification from the host device and transmitting a result corresponding to the received object identification information to the host device.

The first and second object identifications may be transmitted using respective setting units provided in the network printers.

A setting error may be displayed if the transmitted first object identifications do not exist or the transmitted second object identifications exist.

The storing of the setting information may include adding a new management information base (MIB) structure to an existing MIB structure which exists in a private MIB to store management information which is not defined in a standard MIB included in each of the plurality of network printers.

The method may further include performing a processing routine corresponding to the object identification in each of the plurality of network printers.

The performing of the processing routine may include determining whether the received object identification corresponds to any one of the first object identification and the second object identification, checking the first object identification using the setting information when the received object identification corresponds to the second object identification and performing the processing routine corresponding to the checked first object identification.

The transmitting of the result may include, at each of the network printers, generating a response packet including a result value of the processing routine and the received object identification.

The foregoing and/or other aspects and utilities of the present general inventive concept may also be achieved by providing a network system including a plurality of network printers, and a host device to collect management information of the plurality of network printers, wherein the plurality of network printers are connected to the host device and a setting unit to transmit an object identification is provided in each of the plurality of network printers.

The setting unit may transmit the object identification with respect to the plurality of network printers each having a different private management information base (MIB).

The object identification may include the address of each of the network printers.

Each of the plurality of network printers may receive at least one object identification from the host device and transmit a result corresponding to the received object identification to the host device.

The foregoing and/or other aspects and utilities of the present general inventive concept may also be achieved by providing a network printer management apparatus, the apparatus including a first and a second network printer each having an object identification (OID) connected to a single network, a first setting unit corresponding to the first network printer to associate the OID of the second network printer to the OID of the first network printer and a second setting unit corresponding to the second network printer to associate the OID of the first network printer with the OID of the second network printer.

The foregoing and/or other aspects and utilities of the present general inventive concept may also be achieved by providing a method to manage a first and second network printer connected to a single network, the method including associating an object identification (OID) of the second network printer with an OID of the first network printer, associating an OID of the first network printer with an OID of the second network printer, transmitting a single OID to the first and second network printers by a network manager, performing a processing routine at both of the first and second network printers in response to receiving the transmitted single OID and transmitting a result of the performing the processing routine by both of the first and second network printers to the network manager.

The foregoing and/or other aspects and utilities of the present general inventive concept may also be achieved by providing a method of performing a simple network management protocol (SNMP) query to a plurality of network printers, the method including transmitting an object identification (OID) by a SNMP manager to the plurality of network printers, receiving the OID at the plurality of network printers, and determining whether the received OID is a first static OID or a mapping OID corresponding to a second static OID such that, if the received OID is determined to be the first static OID, performing a processing routine corresponding to the first static OID and storing a result value of the processing routine, and transmitting a response packet including the first static OID and the result value to the SNMP manager, and if the received OID is determined to be the mapping OID, checking the second static OID corresponding to the mapping OID, performing a processing routine corresponding to the checked second static OID and storing a result value of the processing routine, and transmitting a response packet including the mapping OID and the result value to the SNMP manager.

The foregoing and/or other aspects and utilities of the present general inventive concept may also be achieved by providing a computer-readable recording medium having embodied thereon a computer program to execute a method, wherein the method includes associating an object identification (OID) of the second network printer with an OID of the first network printer, associating an OID of the first network printer with an OID of the second network printer, transmitting a single OID to the first and second network printers by a network manager, performing a processing routine at both of the first and second network printers in response to receiving the transmitted single OID and transmitting a result of the performing the processing routine by both of the first and second network printers to the network manager.

BRIEF DESCRIPTION OF THE DRAWINGS

These and/or other aspects and advantages of the utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below to explain the present general inventive concept by referring to the figures.

Figure 3:
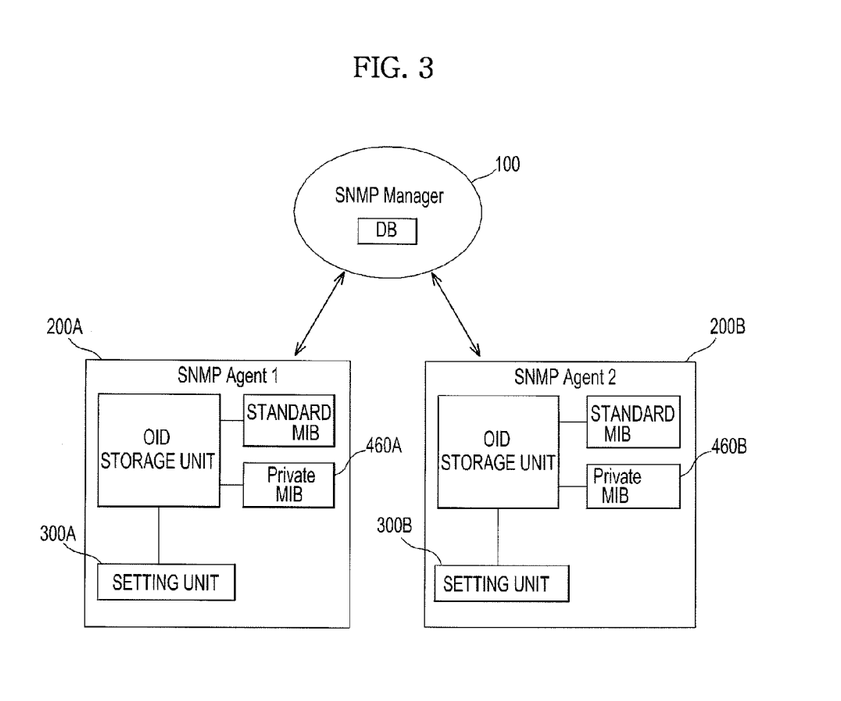
FIG. 3 is a block diagram illustrating a relationship between an SNMP manager and SNMP agents according to an embodiment of the present general inventive concept.

FIG. 3 is a block diagram illustrating a relationship between an SNMP manager 100 and SNMP agents 200A and 200B according to an embodiment of the present general inventive concept. As illustrated in FIG. 3, the network system according to an embodiment of the present general inventive concept includes an SNMP manager 100 which is connected to a single network and manages simple network management protocol (SNMP) agents 1 and 2 (200A and 200B) in an embodiment of the present general inventive concept. The SNMP manager 100 can be implemented by a host device which communicates with network printers 200A' and 200B' using an SNMP program. The SNMP agents 1 and 2 (200A and 200B), for example, may correspond to and reside in a plurality of network printers 200A' and 200B', respectively, for example, each having a different private management information base (MIB) 460A and 460B based on the network printers 200A' and 200B' being manufactured by different companies.

Figure 8:
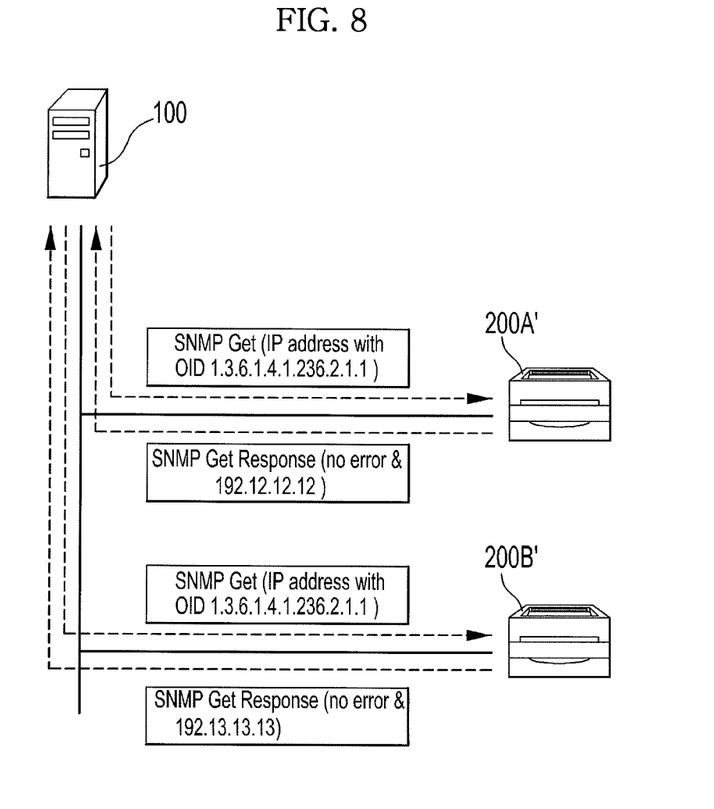
FIG. 8 is a view illustrating an operation in which a manager server communicates with network printers 1 and 2 when the mapping OID is set according to an embodiment of the present general inventive concept.

An apparatus to map an object identification of the network printer 200A' and 200B' according to an embodiment of the present general inventive concept includes setting units 300A and 300B (FIG. 3) which are respectively provided in the corresponding network printers 1 and 2 (200A' and 200B'), as illustrated in FIG. 8, and add new MIB structures to the existing MIB structures of the network printers 200A' and 200B' by a user.

When the tree structure of the MIB of the network printer 1 (200A') is different from the tree structure of the MIB of the network printer 2 (200B'), as a typical example of setting operations of the setting units 300A and 300B, a relationship between an OID of an address of the network printer 1 (200A') and an OID of an address of the network printer 2 (200B') is set, and accordingly, the same OID can be used based on the relationship.

The setting units 300A and 300B may be implemented by a user interface such that a setting operation to connect an OID of the other network printer to its own OID can be easily performed by the user.

Figure 4:
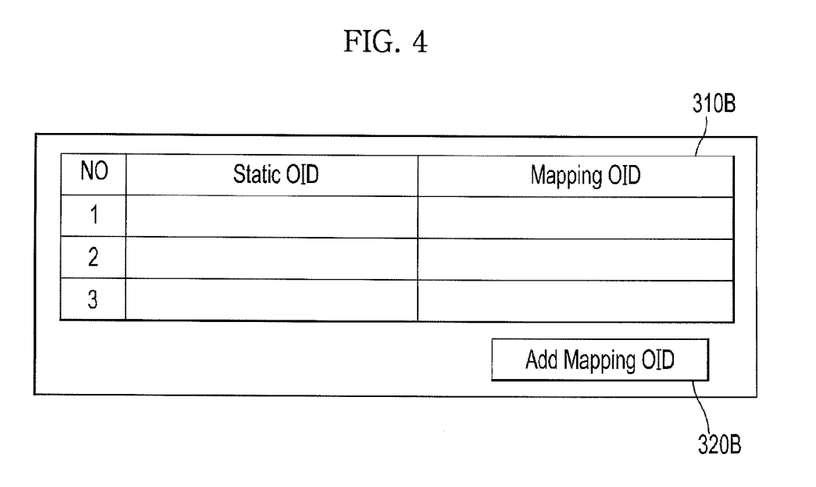
FIG. 4 is an example of an initial screen to map an OID using a setting unit according to an embodiment of the present general inventive concept.
Figure 5:
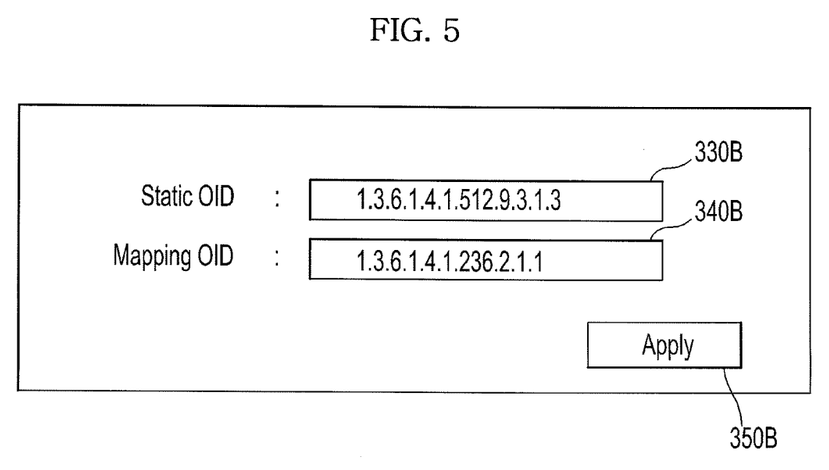
FIG. 5 is an example of a screen to set a relationship between a static OID and a mapping OID using the setting unit according to an embodiment of the present general inventive concept.

For example, referring to FIGS. 4, 5 and 8, the setting unit 300B provides the user with an initial screen such that the OID of the address of the network printer 2 (200B) and the OID of the address of the network printer 1 (200A') are mapped. On the initial screen, an OID list 310B including a static OID 330B to illustrate the OID of the network printer 200B and a mapping OID 340B connected to the static OID, to illustrate the OID of the other network printer 200A', is provided. In addition, a selection bar 320B to execute a describing operation is provided.

Figure 6:
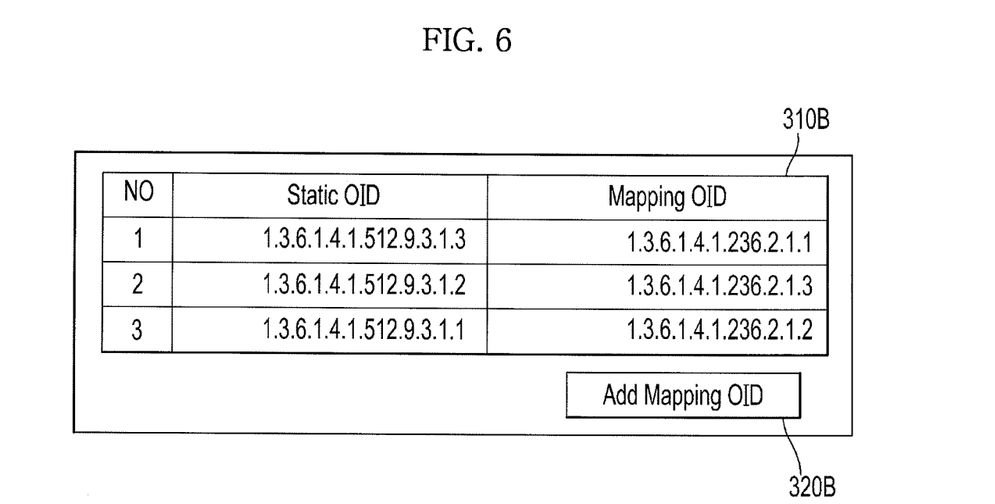
FIG. 6 is an example of a screen to set a connection between the static OID and the mapping OID using the setting unit according to an embodiment of the present general inventive concept.

When the user presses the selection bar 320B, a screen illustrated in FIG. 5 is provided. The OID 1.3.6.1.4.1.512.9.3.1.3 of the address of the network printer 2 (200B') is described in the static OID 330B, the OID 1.3.6.1.4.1.236.2.2.1 of the address of the network printer 1 is described in the mapping OID 340B, and an application tool bar 350B is pressed. Accordingly, OID setting contents can be checked through the screen illustrated in FIG. 6.

Figure 7:
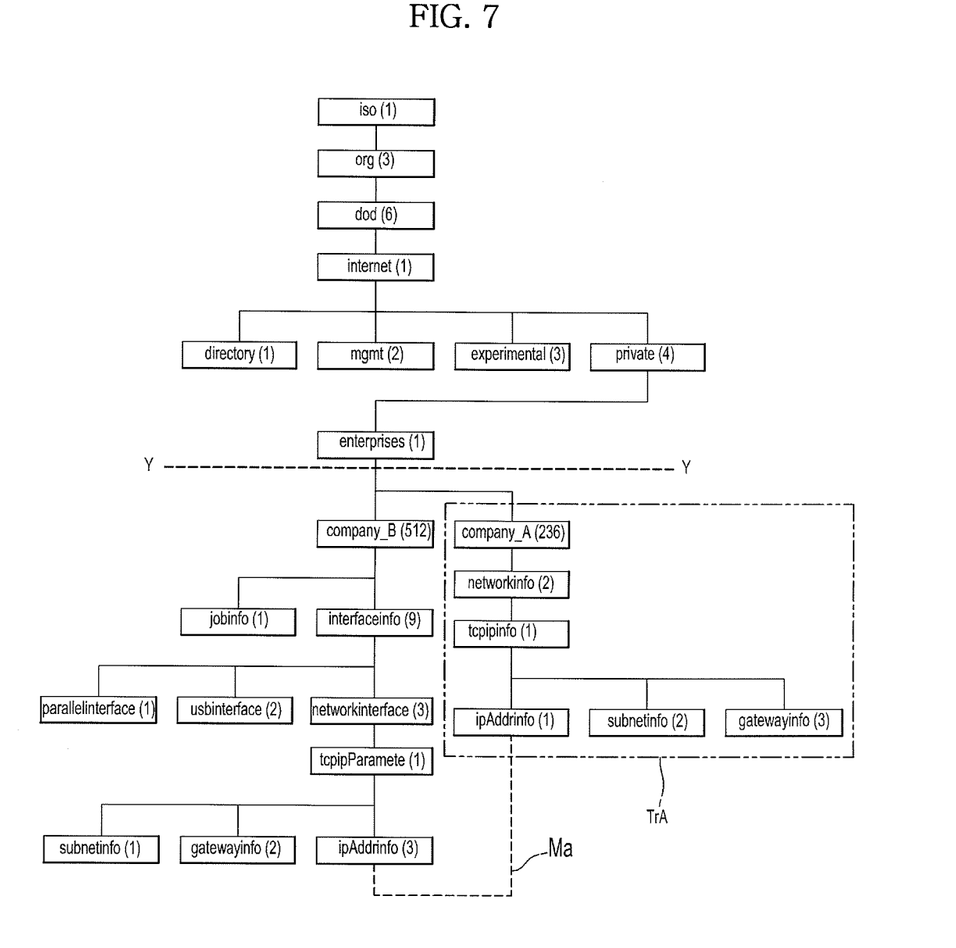
FIG. 7 is a view illustrating a tree structure of an MIB when a mapping OID of a network printer of a company A is added to a network printer of a company B, according to an embodiment of the present general inventive concept.

Further, referring to FIGS. 3, 7 and 8, the entire MIB structure stored in the private MIB 460B of the network printer 2 (200B') manufactured by a company B is a combination of the existing MIB structure and a new MIB structure TrA of the network printer 1 (200A') manufactured by a company A and has a mapping relationship Ma to connect the address ipAddrinfo(1) of the network printer 1 (200A') to the address ipAddrinfo(3) of the network printer 2 (200B').

FIG. 8 is a view illustrating an operation in which a manager server 100 communicates with network printer 1 (200A') and 2 (200B') in an embodiment of the present general inventive concept. With the mapping relationship described above, when the host device 100 transmits an SNIP GET (IP address with the OID 1.3.6.1.4.1.236.2.1.1) to the network printers 1 and 2 (200A' and 200B') in order to obtain address information of the network printers 1 and 2 (200A' and 200B') as illustrated in FIG. 8, the network printer 1 (200A') searches the private MIB 460A', as illustrated in FIG. 3, recognizes that the received OID is its own OID, performs a predetermined processing routine, generates a response packet including the address 192.12.12.12 of the network printer 1 (200A'), and transmits an SNMP Get Response to the host device 100.

The network printer 2 (200B') searches the respective private MIB 460B, as illustrated in FIG. 3, recognizes that the OID of the address of the network printer 2 is connected to the OID of the address of the network printer 1 (200A') belonging to the added MIB structure, performs a predetermined processing routine, generates a response packet including the address 192.13.13.13 of the network printer 2 (200B'), and transmits an SNMP Get Response to the host device 100.

Accordingly, the host device 100 can provide both the address 192.12.12.12 of the network printer 1 and the address 192.13.13.13 of the network printer 2 (200B'). The host device 100 can easily perform an operation to collect the management information of the network printers 1 and 2 (200A' and 200B').

A method to manage network printers according to an embodiment of the present general inventive concept will be described.

Figure 9:
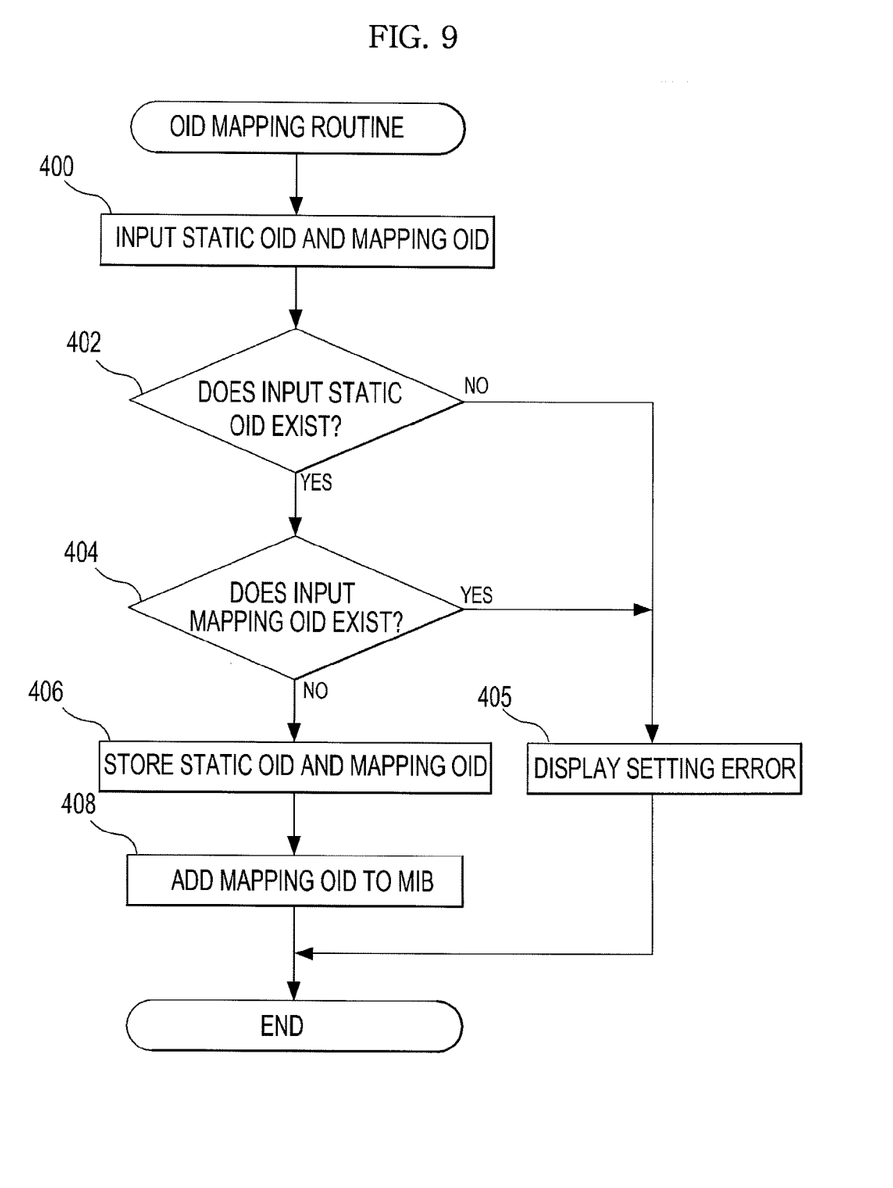
FIG. 9 is a flowchart illustrating an OID mapping routine according to an embodiment of the present general inventive concept.

FIG. 9 is a flowchart illustrating an OID mapping routine according to an embodiment of the present general inventive concept.

Using a setting unit connected to a network printer, in Operation 400, a user inputs an OID of the network printer in a static OID and inputs an OID of another network printer to be mapped as a mapping OID (see FIGS. 4 and 5).

In Operation 402, the network printer determines whether the input static OID exists in a private MIB and, if so, in Operation 404, the network printer determines whether the input mapping OID exists in the private MIB.

In Operation 402, if the input static OID is determined not exist in the private MIB or, in Operation 404, if the input mapping OID is determined to exist in the private MIB, in Operation 405, a setting error is displayed on the network printer such that a user can be notified of the error.

When the input mapping OID does not exist in the private MIB at Operation 404, in Operation 406, the mapping information to connect the input static OID with the input mapping OID is stored in the OID storage unit. Further, a new MIB structure is added to the existing MIB structure based on the mapping information in Operation 408.

Figure 10:
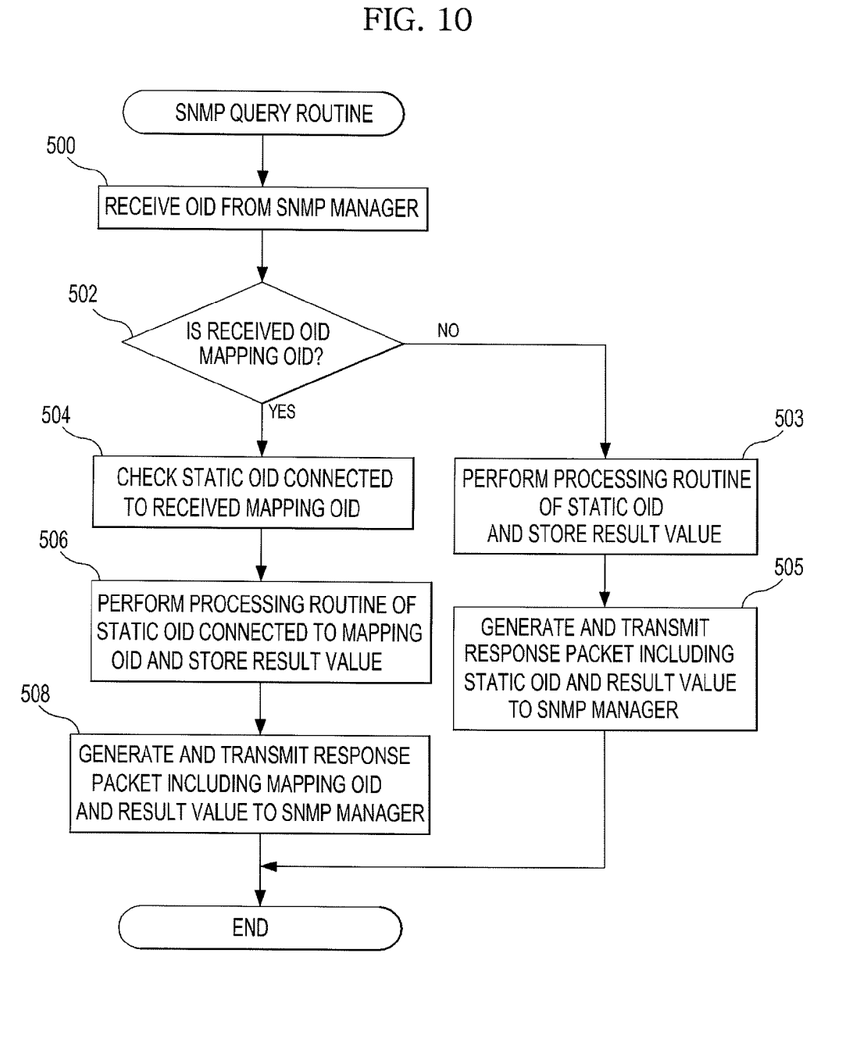
FIG. 10 is a flowchart illustrating an SNMP query routine according to an embodiment of the present general inventive concept.

FIG. 10 is a flowchart illustrating an SNMP query routine according to an embodiment of the present general inventive concept.

An SNMP manager, for example, which is implemented by a host device, transmits an OID to a plurality of network printers in order to collect management information and the network printers receive the OID in Operation 500. Accordingly, the OID transmitted to the network printers may be a static OID which exists in a private MIB of a network printer or a mapping OID which exists in a private MIB in another network printer.

In Operation 502, the network printer determines whether the received OID is the mapping OID, and performs a processing routine corresponding to the static OID and stores a result value when the received OID is not the mapping OID, that is, the received OID is the static OID which originally exists in the private MIB in Operation 503. Accordingly, in Operation 505, the network printer transmits a response packet including the static OID and the result value to the SNMP manager and the routine is finished.

When the received OID is the mapping OID, that is, when the received OID is the mapping OID which is newly added to the private MIB, as the determined result of Operation 502, a static OID connected to the mapping OID is checked in Operation 504, a processing routine corresponding to the static OID is performed as the checked result, and the result value is stored also in Operation 506. Accordingly, the network printer generates and transmits a response packet including the mapping OID and the result value to the SNMP manager in Operation 508 and then the routine is finished.

As described above, according to various embodiments of the present general inventive concept, it is possible to allow network printers with different MIBs from each other, such as those manufactured by different companies to be compatible with one another by adding a new MIB structure, for example, as defined by a user to the existing MIB structure.

According to various embodiments of the present general inventive concept, with respect to network printers manufactured by different companies, when connections between static OIDs of the network printers and mapping OIDs, that is, OIDs of the other network printers, are previously set by a user, a network manager can easily collect management information of the network printers using the same object identification. Thus, management efficiency of the network printers can be improved.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A method to manage a plurality of network printers to collect management information of the network printers connected to a host device, the method comprising:
   receiving inputs of a first object identification of a first network printer, which is one of the plurality of network printers, and a second object identification of a second network printer, which is another one of the plurality of network printers, from a user;
   storing setting information to map the inputted first object identification and the inputted second object identification;
   associating the inputted second object identification to the inputted first object identification;
   receiving at least one object identification from the host device; and
   transmitting a result corresponding to the received object identification information to the host device.

2. The method according to claim 1, wherein the first and second object identification are inputted using respective setting units provided in the network printers.

3. The method according to claim 1, wherein a setting error is displayed if the inputted first object identification does not exist or the inputted second object identification exists.

4. The method according to claim 1, wherein the storing of the setting information comprises:
   adding a new management information base (MIB) structure to an existing MIB structure which exists in a private MIB to store management information which is not defined in a standard MIB included in each of the plurality of network printers.

5. The method according to claim 1, further comprising:
   performing a processing routine corresponding to the object identification in each of the plurality of network printers.

6. The method according to claim 5, wherein the performing of the processing routine comprises:
   determining whether the received object identification corresponds to any one of the first object identification and the second object identification;
   checking the first object identification using the setting information when the received object identification corresponds to the second object identification; and
   performing the processing routine corresponding to the checked first object identification.

7. The method according to claim 6, wherein the transmitting of the result comprises:
   at each of the network printers, generating a response packet including a result value of the processing routine and the received object identification.

8. A network system, comprising:
   a plurality of network printers; and
   a host device to collect management information of the plurality of network printers, wherein each of the plurality of network printers is connected to the host device and has a setting unit to receive inputs of object identifications corresponding to different network printers from a user and to map the inputted object identifications to each other.

9. The network system according to claim 8, wherein the setting unit receives inputs of the object identification with respect to the plurality of network printers each having a different private management information base (MIB).

10. The network system according to claim 9, wherein the object identification includes the address of each of the network printers.

11. The network system according to claim 8, wherein each of the plurality of network printers receives at least one object identification from the host device and transmits a result corresponding to the received object identification to the host device.

12. A network printer management apparatus, the apparatus comprising:
a first and a second network printer each having an object identification (OID) connected to a single network;
a first setting unit corresponding to the first network printer to receive a static OID of the second network printer and a mapping OID of the first network printer by a user and to associate the OID of the second network printer to the OID of the first network printer; and
a second setting unit corresponding to the second network printer to associate the OID of the first network printer with the OID of the second network printer.

13. The apparatus according to claim 12, further comprising:
a network manager to transmit a single OID to the first and second network printers such that both the first and second network printers respond to the single transmitted OID,
wherein at least one of the first and second network printers have a different OID from the single OID transmitted by the network manager and recognizes the OID thereof using the associated OID information of the respective setting unit.

14. The apparatus according to claim 12, wherein the OID of each of the first and second network printers are internet protocol addresses that are different from each other.

15. The apparatus according to claim 12, wherein the first setting unit corresponding to the first network printer to associate the OID of the second network printer to the OID of the first network printer includes receiving a static OID of the first network printer and a mapping OID of the second network printer by a user.

16. The apparatus according to claim 12, wherein the first and second setting units comprise simple network management protocol (SNMP) agents.

17. The apparatus according to claim 16, wherein the first and second SNMP agents reside in the first and second network printers, respectively.

18. The apparatus according to claim 16, wherein each of the SNMP agents further comprises:
a standard management information base (MIB); and
a private MIB to store setting information.

19. A method to manage a first and a second network printer connected to a single network, the method comprising:
receiving inputs of an object identification (OID) of the second network printer and an OID of the first network printer from a user;
associating, in a first management information base (first MIB) of the first network printer, the object identification (OID) of the second network printer with the OID of the first network printer;
associating, in a second management information base (second MIB) of the second network printer, the OID of the first network printer with the OID of the second network printer;
transmitting a single OID to the first and second network printers by a network manager;
performing a processing routine at both of the first and second network printers in response to receiving the transmitted single OID; and
transmitting a result of the performing the processing routine by both of the first and second network printers to the network manager.

20. A method of performing a simple network management protocol (SNMP) query to a plurality of network printers, the method comprising:
transmitting an object identification (OID) by a SNMP manager to the plurality of network printers;
receiving the OID at the plurality of network printers; and
determining whether the received OID is a first static OID or a mapping OID corresponding to a second static OID such that,
if the received OID is determined to be the first static OID, performing a processing routine corresponding to the first static OID and storing a result value of the processing routine, and transmitting a response packet including the first static OID and the result value to the SNMP manager, and
if the received OID is determined to be the mapping OID, checking the second static OID corresponding to the mapping OID, performing a processing routine corresponding to the checked second static OID and storing a result value of the processing routine, and transmitting a response packet including the mapping OID and the result value to the SNMP manager.

21. A non-transitory computer-readable recording medium having embodied thereon a computer program to execute a method, wherein the method comprises:
receiving inputs of an object identification (OID) of the second network printer and an OID of the first network printer from a user;
associating, in a first management information base (first MIB) of the first network printer, the object identification (OID) of the second network printer with the OID of the first network printer;
associating, in a second management information base (second MIB) of the second network printer, the OID of the first network printer with the OID of the second network printer;
transmitting a single OID to the first and second network printers by a network manager;
performing a processing routine at both of the first and second network printers in response to receiving the transmitted single OID; and
transmitting a result of the performing the processing routine by both of the first and second network printers to the network manager.

* * * * *